Dec. 9, 1930.                    W. M. DUNCAN                    1,784,001
                                MECHANICAL STOKER
                               Filed Sept. 17, 1926
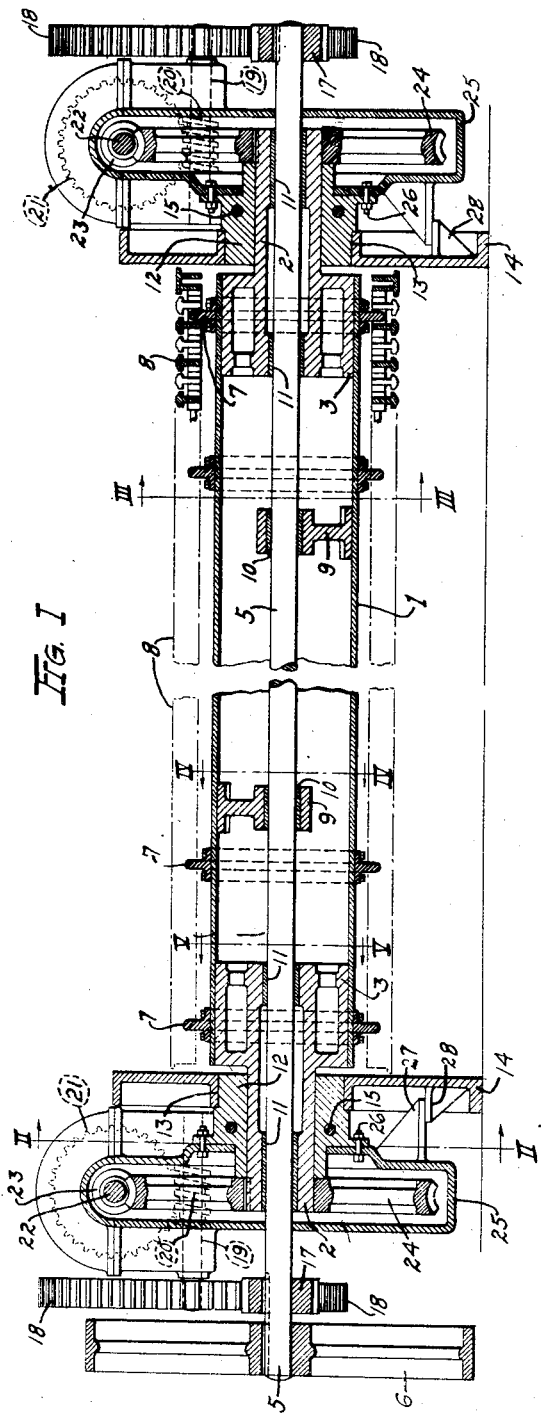
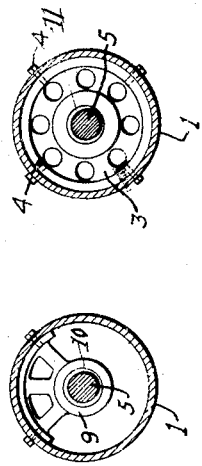
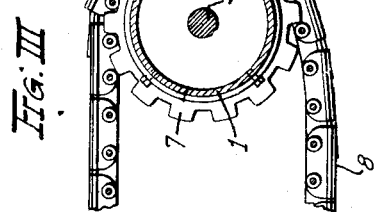
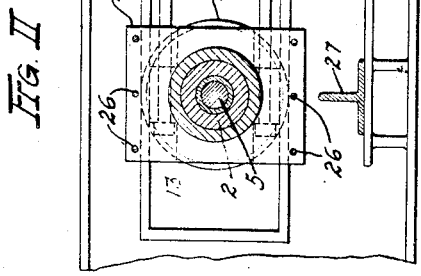
INVENTOR
W. M. DUNCAN
By Cook & McCauley
ATTORNEYS Patented Dec. 9, 1930

1,784,001

UNITED STATES PATENT OFFICE

WILLIAM M. DUNCAN, OF ALTON, ILLINOIS

MECHANICAL STOKER

Application filed September 17, 1926. Serial No. 136,053.

This invention relates to improvements in mechanical stokers, one of the objects being to produce a strong and simple driving device adapted to withstand the severe stresses involved in supporting and driving a chain grate. My object is to avoid undue bending and torsional stresses and at the same time utilize a relatively light and compact arrangement of elements to drive the chain grate.

This feature of the invention may be used with grates of any width, but it is especially advantageous in connection with exceptionally wide and heavy chain grates.

Another object is to prevent disarrangement of the power transmission gearing when the driving means is adjusted to tighten the chain grate. In the preferred form of the invention, a rotary driving device meshes with the grate, and this device is supported in adjustable bearings which carry the power transmission gearing.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a vertical section through the driving mechanism of a mechanical stoker constructed in accordance with my invention, portions of the grate being shown in outline only by dot and dash lines.

Fig. II is a section taken on the line II—II in Fig. I.

Fig. III is a section taken on the line III—III in Fig. I.

Fig. IV is a section taken on the line IV—IV in Fig. I.

Fig. V is a section taken on the line V—V in Fig. I.

1 designates a rotatable tube provided with hollow trunnions 2 which extend from the ends of the tube, each trunnion having a head 3 located inside of the tube and secured thereto by means of fastening devices 4 shown in Fig. V. A rotatable shaft 5, extending through the tube 1, is provided at one end with a pulley 6 to drive said tube through the medium of speed-reducing gearing located near each end of the tube, as will be hereafter described.

Toothed rings 7, surrounding and secured to the tube 1, mesh with and drive a chain grate 8, as shown in Figs. I and III. Portions of the grate 8 are shown at the right side of Fig. I, and the dot and dash lines extending therefrom indicate that the grate extends approximately from end to end of the tube 1.

Secured inside the tube 1 are bearings 9, as shown in Figs. I and IV, provided with antifriction linings 10, said bearings serving as supports for the shaft 5. The trunnions 2 are also provided with antifriction members 11 forming bearings for the shaft.

The trunnions 2 are supported in bearings 12, the latter being slidably mounted in rectangular apertures 13 formed in the side frames 14. The means for adjusting the bearings 12 comprises bolts 15 secured to said bearings and extending from the side frames (Fig. II) to receive nuts 16 which bear against said frames. The bearings 12 carry the tubular grate-supporting member 1, and when said bearings are moved the chain grate is correspondingly tightened or loosened.

The means for simultaneously transmitting power from the shaft 5 to both ends of the large tubular member 1 comprises two sets of gearing located near the ends of the shaft, and each of these sets includes a pinion 17 secured to the shaft and meshing with a gear 18 on a shaft 19 having a worm 20 meshing with a worm gear 21, the latter being on a shaft 22 provided with a worm 23 meshing with a large worm gear 24 on one end of a trunnion 2. The driving pinion 17 is supported by the shaft 5, and the large driven gear 24 is supported by the hollow trunnion, while the remaining elements of this gearing are supported by a housing 25 attached to the bearing 12 by means of bolts 26. Therefore, when the bearings 12 are adjusted they will carry the large tube 1 and all of the elements of the transmission gearing, thereby preventing displacement of the gears when an adjustment is made to tighten the grate.

To aid in supporting the gear housing 25, it is provided with an extension 27 (Figs. I and II) slidably mounted on a horizontal web 28 extending from the adjacent side frame 14.

Attention is directed to the strength and rigidity of the large tubular member 1 which drives the chain grate and at the same time forms a support for this heavy chain structure. To minimize the torsional stresses, this strong tubular member is preferably driven at both ends by means of the gearing at opposite ends of the shaft 5. This shaft 5 is not subjected to severe torsional stresses, for the power is transmitted through speed-reducing gearing to relieve the shaft of the severe stresses which are borne by the relatively strong tube 1.

In addition to the advantages of simultaneously transmitting power to both ends of the large rigid tube 1, and minimizing the torsion in the long shaft 5, I have produced a compact driving mechanism which occupies very little space in the stoker and does not in any way interfere with the elements of the traveling chain grate.

I claim:

1. In a mechanical stoker, a chain grate, and a driving device comprising a rotatable tube supporting a portion of said grate, main bearings supporting said tube, a rotatable shaft extending through said tube, said tube being provided with bearings in which said shaft is supported, and means whereby power is simultaneously transmitted from said shaft to each end of said tube, said means including gearing near each end of the tube.

2. In a mechanical stoker, a chain grate, a rotatable tube, supporting a portion of said grate, bearings within said tube, a driving shaft supported in said bearings, and means whereby power is simultaneously transmitted from said shaft to the opposite ends of said tube.

3. In a mechanical stoker, a chain grate, a rotatable tube supporting a portion of said grate, trunnions supporting said tube, a driving shaft extending through and rotatably supported by said trunnions, and means whereby power is simultaneously transmitted from said shaft to the opposite ends of said tube.

4. In a mechanical stoker, a chain grate, a rotatable supporting tube whereby said grate is driven, a portion of said grate being supported by said tube, trunnions secured to said tube and extending from the ends thereof, bearings in which said trunnions are rotatably supported, a driving shaft extending through said tube and trunnions and projecting from the ends of said trunnions, said shaft being supported by said trunnions, and means whereby power is simultaneously transmitted from said shaft to both of said trunnions.

5. In a mechanical stoker, a chain grate, a rotatable supporting tube whereby said grate is driven, a portion of said grate being supported by said tube, trunnions secured to and extending from the ends of said tube, main bearings in which said trunnions are supported, shaft bearings within said tube and trunnions, a driving shaft extending through and supported by said shaft bearings and projecting from the ends of said trunnions, and two sets of speed-reducing gearing whereby power is simultaneously transmitted from said shaft to said trunnions.

6. In a mechanical stoker, a chain grate, a driving device comprising a rotatable tube supporting a portion of said chain grate, a driving shaft extending through and supported by said tube and projecting from the ends thereof, a bearing at each end of said tube for the supporting thereof, a driving gear secured to each end of said driving shaft, a driven gear secured to each end of the tube, sets of intermediate gearing through which power is transmitted from said driving gears to the respective driven gears, each set of intermediate gearing being carried by one of said bearings, and means whereby all of the aforesaid parts are shifted at the same time to adjust the chain grate, said means including an adjusting device cooperating directly with said bearings.

7. In a mechanical stoker, a chain grate, a driving device comprising a rotatable tube supporting a portion of said grate, a driving shaft extending through said tube and projecting from the ends thereof, a bearing supporting each end of said tube, a driving gear secured to each end of said shaft, a driven gear secured to each end of said tube, and sets of intermediate gearing through which power is simultaneously transmitted from said driving gears to the respective driven gears, said tube being provided with bearings in which said shaft is supported, and each set of intermediate gearing being carried by one of the first mentioned bearings.

In testimony that I claim the foregoing I hereunto affix my signature.

WILLIAM M. DUNCAN.